US012786350B1

(12) United States Patent
Gad et al.

(10) Patent No.: US 12,786,350 B1
(45) Date of Patent: Nov. 3, 2026

(54) DYNAMIC FLOATING REACTIONS IN VIDEO CONFERENCES

(71) Applicant: Zoom Communications, Inc., San Jose, CA (US)

(72) Inventors: Mohamed Yosry Elsayed Mohamed Gad, San Francisco, CA (US); Lin Han, Los Altos, CA (US); Qiang Li, Hangzhou (CN); Edwin Barton Yeary, Orinda, CA (US); Huixi Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 15 days.

(21) Appl. No.: 18/774,182

(22) Filed: Jul. 16, 2024

Related U.S. Application Data

(60) Provisional application No. 63/569,182, filed on Mar. 24, 2024.

(51) Int. Cl.
*H04N 7/15* (2006.01)
*H04N 5/262* (2006.01)
*H04N 21/2365* (2011.01)

(52) U.S. Cl.
CPC ............. *H04N 7/15* (2013.01); *H04N 5/2628* (2013.01); *H04N 21/2365* (2013.01)

(58) Field of Classification Search
CPC ..... H04N 7/15; H04N 5/2628; H04N 21/2365
USPC .......................................................... 709/238
See application file for complete search history.

(56) References Cited

U.S. PATENT DOCUMENTS

| | | | | |
|---|---|---|---|---|
| 9,843,768 | B1 | 12/2017 | Negi et al. | |
| 11,962,860 | B1 * | 4/2024 | Chen | H04L 51/52 |
| 2007/0216675 | A1 * | 9/2007 | Sun | G06T 11/00 348/51 |
| 2016/0098972 | A1 * | 4/2016 | Feit | G06T 11/001 345/593 |
| 2022/0171960 | A1 * | 6/2022 | Nelson | A63F 13/53 |
| 2023/0082886 | A1 * | 3/2023 | Booth | H04N 7/15 715/753 |
| 2024/0080215 | A1 * | 3/2024 | Lin | H04L 12/1822 |

OTHER PUBLICATIONS

F.-L. Zhang, C. Barnes, H.-T. Zhang, J. Zhao and G. Salas, “Coherent video generation for multiple hand-held cameras with dynamic foreground,” in Computational Visual Media, vol. 6, No. 3, pp. 291-306, Sep. 2020 (Year: 2020).*

(Continued)

*Primary Examiner* — Taylor A Elfervig
(74) *Attorney, Agent, or Firm* — Young Basile Hanlon & MacFarlane, P.C.

(57) ABSTRACT

A selection of a digital symbol is received from a conference participant of a video conference. A video stream of the conference participant is received. A plurality of instances of the digital symbol are dynamically integrated at different locations within frames of the video stream to obtain a modified video stream. The modified video stream is transmitted for display at devices of other conference participants of the video conference. A first instance of the plurality of the instances of the digital symbol may be set to a first size and a second instance of the plurality of the instances of the digital symbol may be set to a second size that is different from the first size.

20 Claims, 10 Drawing Sheets

(56) References Cited

OTHER PUBLICATIONS

Nguyen et al., "ITEM: Immersive Telepresence for Entertainment and Meetings—A Practical Approach", Arxiv—Cornell University, 2014, p. 1-14 (Year: 2014).*
Z. Lou et al., "PresenceScape: Virtual world mediated rich communication," in Bell Labs Technical Journal, vol. 16, No. 4, pp. 219-242, Mar. 2012 (Year: 2012).*
Google Meet Help, Use Reactions in Google Meet, <https://support.google.com/meet/answer/13151720?hl=en&co=GENIE.Platform%3DDesktop> Retrieved from Internet Jul. 16, 2024, 3 pages.
Microsoft Support, Express yourself in Microsoft Teams meetings with live reactions, <https://support.microsoft.com/en-us/office/express-yourself-in-microsoft-teams-meetings-with-live-reactions-a8323a40-3d07-4129-934b-305370a36e21> Retrieved from Internet Jul. 16, 2024, 5 pages.
Webex Help Center, Use reactions in Webex Meetings and Webex Webinars, Jun. 7, 2024, 3 pages.
YouTube, Express yourself with gestures and reactions in Webex, <https://www.youtube.com/watch?v=mc-IQodoAiA> Webex, Jun. 8, 2021, 2 pages.

* cited by examiner

DYNAMIC FLOATING REACTIONS IN VIDEO CONFERENCES

CROSS REFERENCE TO RELATED APPLICATIONS

This application claims the benefit of U.S. Provisional Patent Application Ser. No. 63/569,182, filed Mar. 24, 2024, the entire disclosure of which is incorporated herein by reference.

FIELD

This disclosure generally relates to video conferences, and, more specifically, to dynamic floating reactions in video conferences.

BRIEF DESCRIPTION OF THE DRAWINGS

This disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
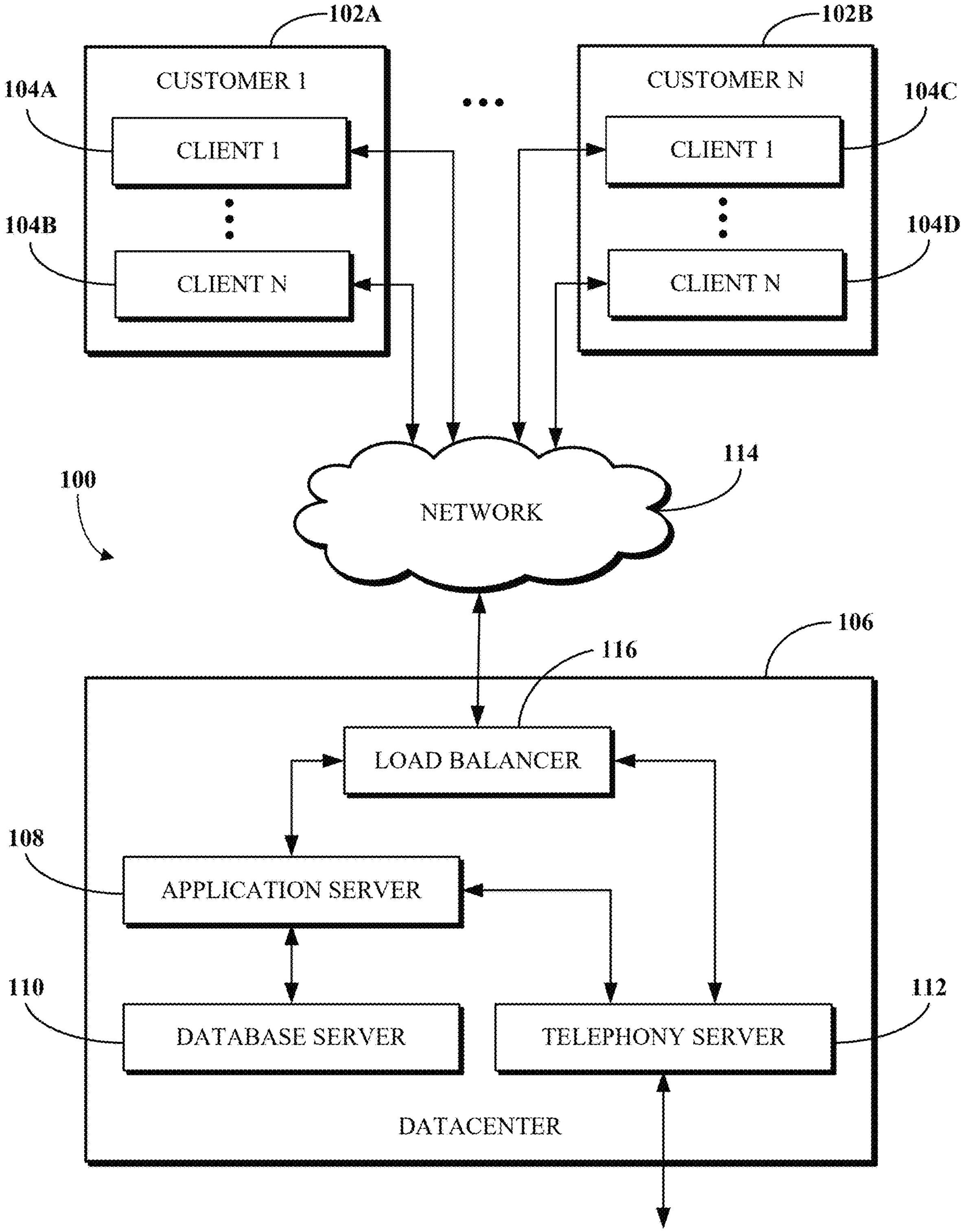
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Conferencing software may enable conference participants to provide non-verbal feedback in video conferences through digital symbols, such as emoji reactions. An emoji is a small digital image or icon used to express an idea, emotion, or feeling in electronic communications. Emojis have become a ubiquitous part of digital communication, allowing users to convey emotions and reactions. Such reactions and digital symbols can be useful in expressing feelings, showing agreement, or giving feedback without interrupting the flow of the meeting, thereby enriching communication dynamics in a non-disruptive manner.

Conventional conferencing software may display emojis in a static and non-engaging manner, such as in the top left corner of a participant's video tile. However, this traditional approach to displaying reactions fails to capture the dynamic nature of in-person interactions and significantly limits the potential for expressive and interactive communication. The static placement and lack of integration with the video or virtual backgrounds of participants do not fully leverage the visual and interactive capabilities of video conferencing. The static display of reactions lacks the ability to fully engage participants in a digital environment, leading to a more passive and less immersive meeting experience. For example, in a lively discussion or celebration, the limited expression capabilities cannot adequately reflect the enthusiasm or mood of the meeting.

Implementations according to this disclosure solve problems such as these using dynamic floating digital symbol reactions that significantly boost user engagement and interaction in video conferences. Dynamic floating digital symbol reactions augment video streams of conference participants with digital symbols that float around. The digital symbols may be configured to float in front and/or behind the conference participants, seamlessly blending with their backgrounds. Dynamic floating digital symbol reactions create a more immersive and visually appealing reaction experience, with digital symbols moving in various sizes and depths across the screen. Such interactivity enhances expressiveness, encourages active participation, and strengthens the sense of connection among conference participants, thereby enriching the communication dynamics of virtual gatherings. The result is a more engaging, visually dynamic interface that more closely replicates the nuance of real-life interactions, elevating the overall quality of online gatherings.

In some implementations, a selection of a digital symbol is received from a conference participant of a video conference. A video stream of the conference participant is received. A plurality of instances of the digital symbol are dynamically integrated at different locations within frames of the video stream to obtain a modified video stream. The modified video stream is transmitted for display at devices of other conference participants of the video conference. A first instance of the plurality of the instances of the digital symbol may be set to a first size and a second instance of the plurality of the instances of the digital symbol may be set to a second size that is different from the first size.

To describe some implementations in greater detail, reference is first made to examples of hardware and software structures used to implement a system for dynamic floating reactions in video conferences. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
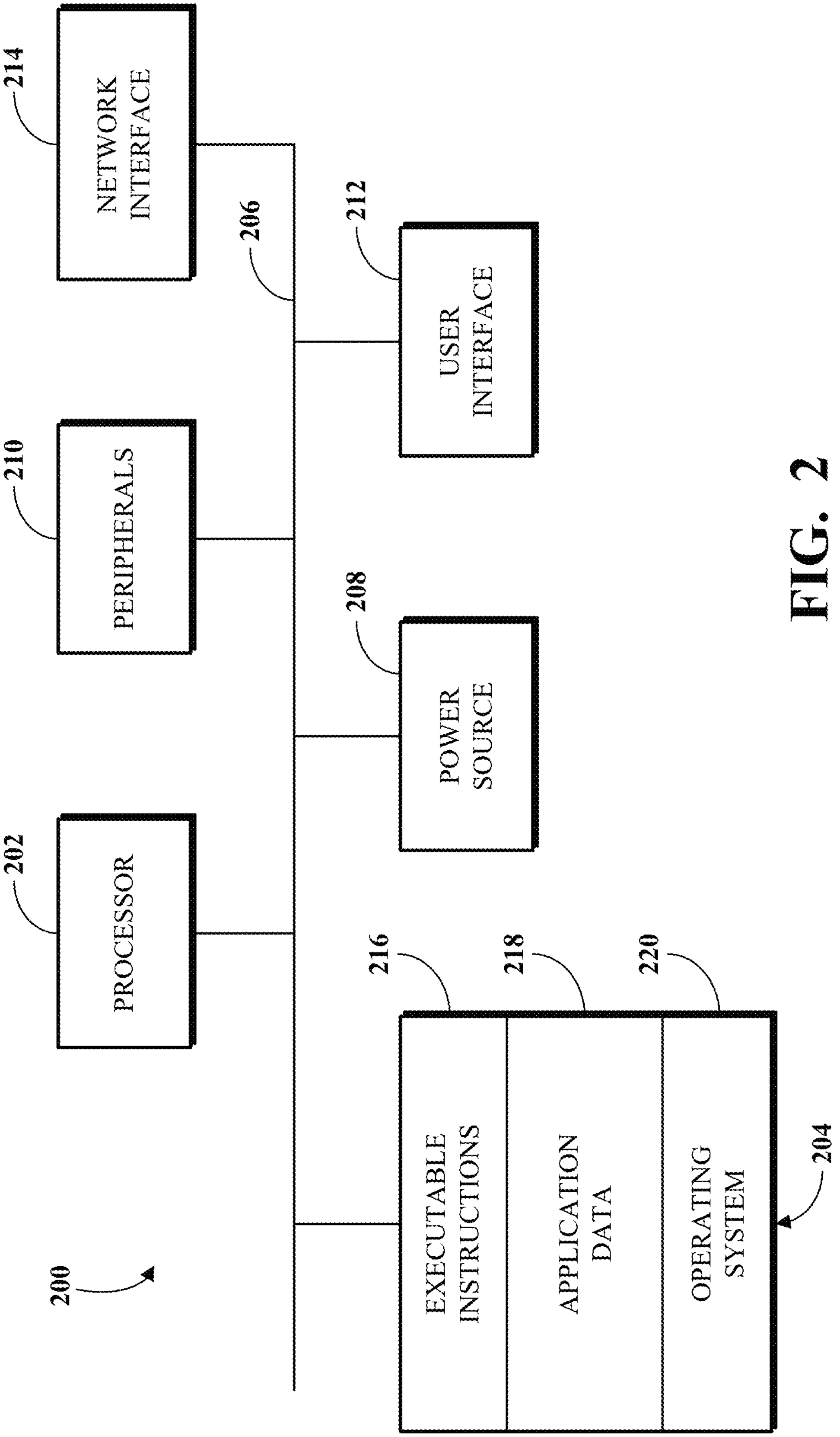
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
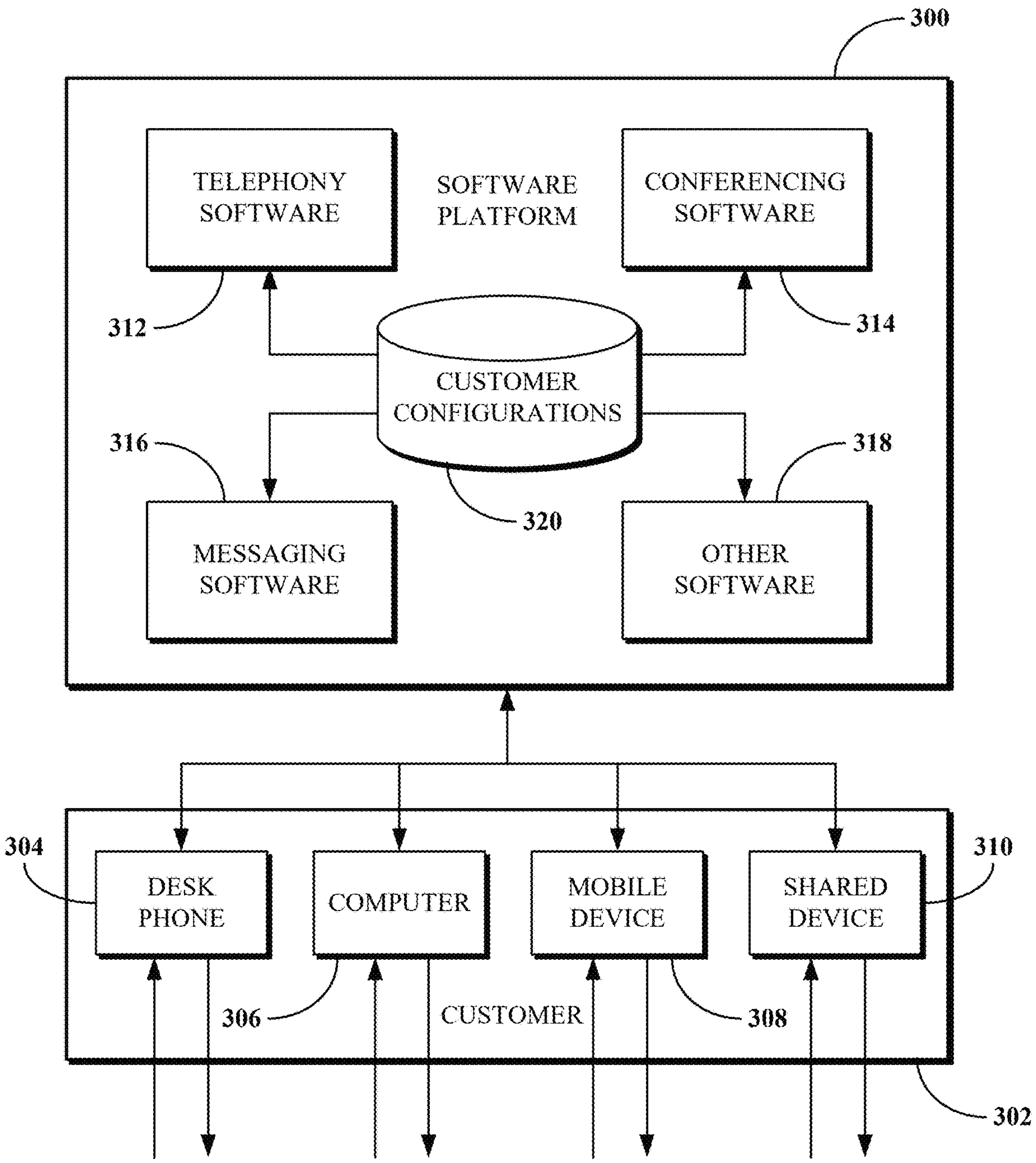
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)—a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include reaction software for enhancing interactive communication in video conferences. In some such cases, the conferencing software 314 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
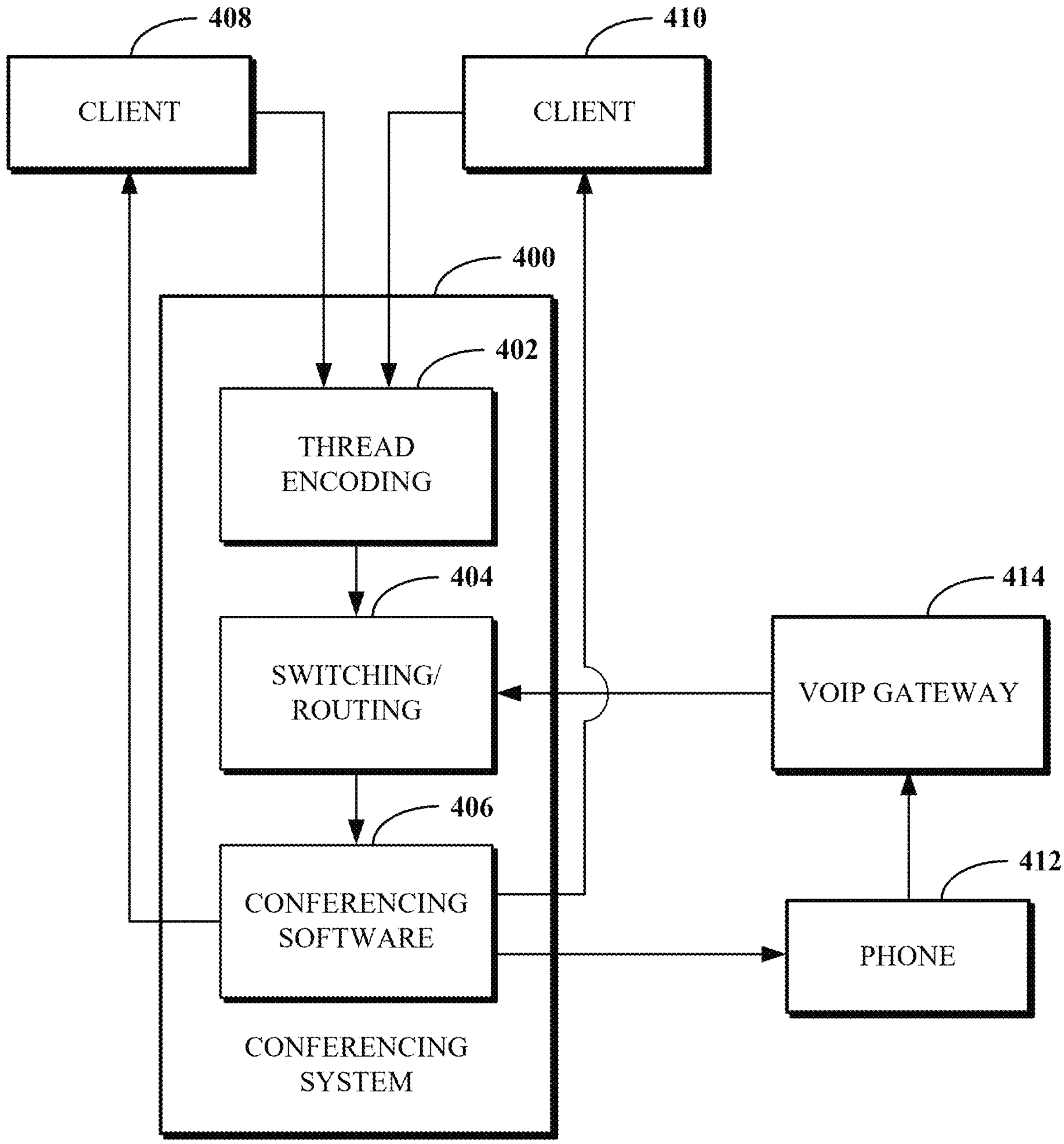
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to as an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
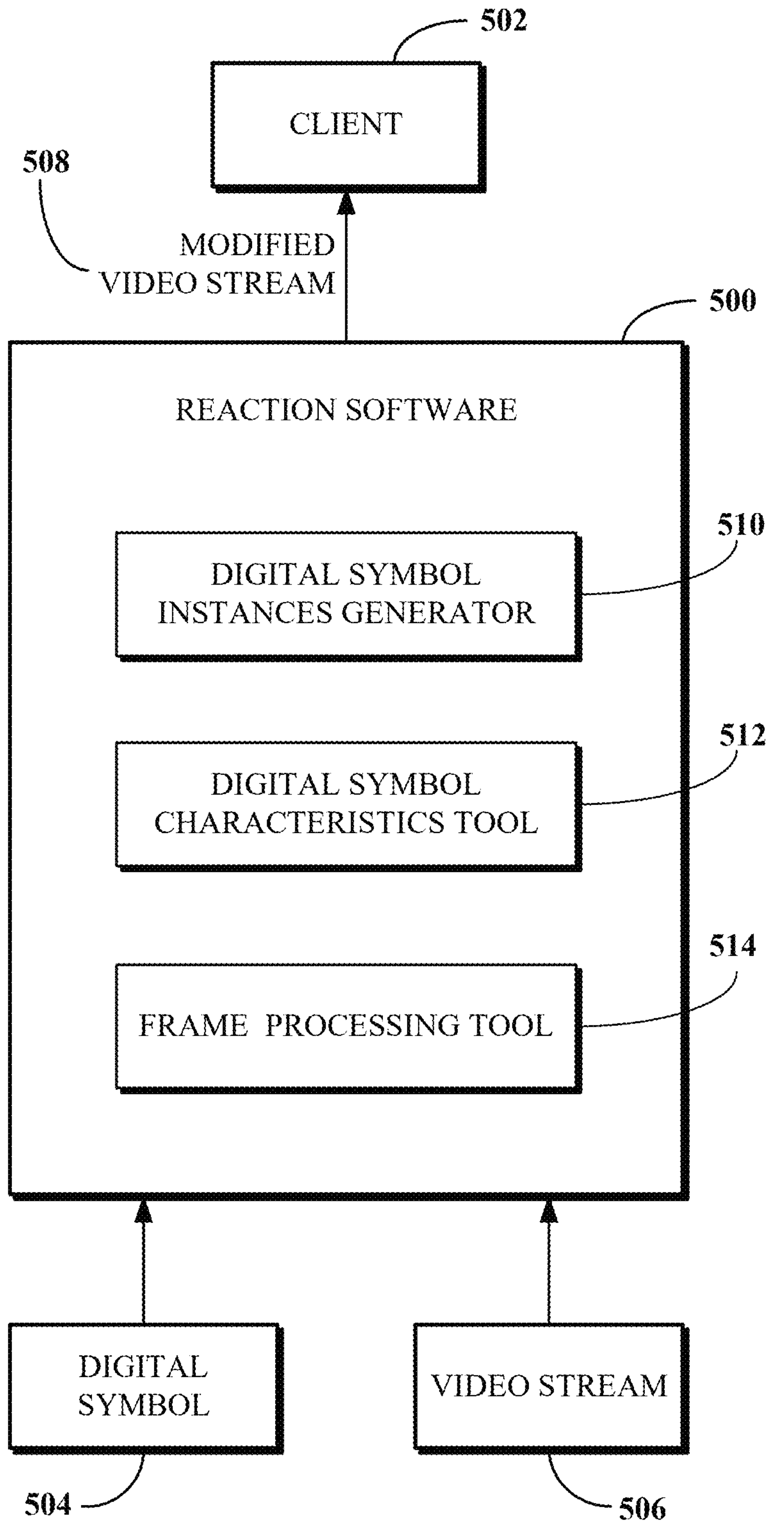
FIG. 5 is a block diagram of an example of functionality of a reaction software for enhancing interactive communication in video conferences.

FIG. 5 is a block diagram of an example of functionality of a reaction software 500 for enhancing interactive communication in video conferences. The reaction software 500 operates to augment the visual interactivity within a video conference by incorporating dynamic digital symbols (e.g., visual elements) into live video streams. The reaction software 500 can be implemented by a client associated with a conference participant, such as one or both of the clients 408 and 410 of FIG. 4. FIG. 5 illustrates that at least two clients (e.g., devices) are connected to a video conference hosted or facilitated by a software platform, such as the software platform 300 of FIG. 3 or a conferencing system, such as the conferencing system 400 of FIG. 4. Namely, the devices connected to the video conference are a client 502 and the client (e.g., device) that implements the reaction software 500. As can be appreciated, the video conference can include more conference participants (e.g., more devices).

At a high level, the reaction software 500 receives a digital symbol 504, inserts multiple instances (e.g., copies) of the digital symbol 504 in frames of a video stream 506 associated with the conference participant to obtain a modified video stream 508, which is displayed at devices connected to the video conference, such as the client 502 and the client implementing the reaction software 500, thereby enabling dynamic, non-verbal interactions that enrich virtual video conference experiences.

The digital symbol 504 may be selected by the conference participant via a conferencing user interface associated with the video conference, such as described with respect to FIG.

6A. The conference participant may select the digital symbol 504 to express a reaction (e.g., a non-verbal reaction or an emotion). To illustrate, and without limitations, a thumbs-up, a heart, or a smiley face may be used to visually express agreement, appreciation, or happiness, respectively. The digital symbol may be selected from a set of digital symbols available via the conferring user interface. The digital symbol 504 can be an emoji, an emoticon, a text string, a graphical icon, an animated element, or any other graphical symbol available via the conferring user interface for expressing a reaction.

An emoji is a small digital image or pictogram used in electronic communications and web pages to represent emotions, activities, objects, or symbols. Emojis may be standardized and may be universally recognizable across different platforms and devices. An emoticon is a textual representation of a facial expression using characters—such as punctuation marks, numbers, and letters—to express a person's feelings or mood. For example, the common emoticon for a smiley face is ":-)".

A graphical icon is a small, symbolic image or visual representation of a program, function, data, or a commonly understood item or action, used to visually communicate with users. Icons may be used in graphical user interfaces to facilitate user interaction. An animated element in digital communications can refer to any visual graphic that includes movement or a sequence of frames that depict motion. This could be a simple animation, such as a waving hand or a complex sequence such as an animated character performing an action. One common format for animated elements is the Graphics Interchange Format (GIF). GIFs are used to create short looping animations without sound and used in digital communication for expressing emotions, reactions, or to add humorous elements to conversations. Animated elements may be used to attract attention or convey information dynamically.

The reaction software 500 receives a continuous input in the form of the video stream 506, which captures live images of the conference participant. For example, the conference participant may have enabled a camera associated with the video conference and the video stream 506 can be a stream of images captured by the camera for transmission to and display at devices of conference participants. In an example, the video stream 506 may include a virtual background instead of an actual/physical backdrop of the conference participant as captured by the camera. A virtual background may be dynamically chosen by the conference participant to enhance visual engagement or privacy. In an example, the reaction software 500 may itself be configured to replace the actual background with the virtual background.

The reaction software 500 modifies frames within the video stream 506 to obtain the modified video stream 508. The reaction software 500 embeds multiple instances of the selected digital symbol 504 at various spatial locations within the video frames of the video stream 506, thus generating a composition where the digital symbols appear to interact with the image of the conference participant. The modified video stream 508 is subsequently transmitted (e.g., streamed) to devices participating in the video conference. The modified video stream 508 is transmitted to client 502, and it is also rendered on the display of the client operating the reaction software 500.

The reaction software 500 includes tools, such as programs, subprograms, functions, routines, subroutines, operations, and/or the like for dynamically highlighting multiple speakers in a conference (e.g., a video conference). As shown, the reaction software 500 includes a digital symbol instances generator 510, a digital symbol characteristics tool 512, and a frame processing tool 514. The operations of the reaction software 500 are further illustrated with respect to FIGS. 6A-7B.

The digital symbol instances generator 510 generates a number of instances of the digital symbol 504. In an example, a fixed quantity of instances is generated. In another example, a random quantity of digital symbol copies are instantiated. In an example, a first quantity of foreground instances are generated and a second quantity of background instances are generated. To illustrate, and without limitations, five foreground instances and six background instances may be generated. For brevity, digital symbol instances may also be referred to herein as instances. In an example, the first quantity of foreground instances and a second quantity of background instances are such that the absolute difference between them does not exceed a threshold difference so as to maintain a balance between the foreground instances the background instances.

The foreground instances are to be added to the frames in front of depictions of the conference participant; and the background instances are added behind the depictions of the conference participant. As such, the foreground instances are perceived to be floating in front of the conference participant and closer to the viewer and the background instances are perceived to be floating behind the conference participant, creating an illusion of depth relative to the images of the conference participant in the modified video stream 508. "Front" and "behind" refer to the layering of the instances with respect to the silhouette of the conference participant, with the "front" instances overlaid on top of the image of the conference participant and the "behind" instances sandwiched between the silhouette of the conference participant and the video background.

The digital symbol instances generator 510 may assign a respective random starting position and may assign a respective random ending position to each of the instances of the digital symbol 504, which are used, as described herein, to simulate movements of the instances across the video frame. In an example, the starting positions may be configured to equally distribute the instances throughout various regions of the video frame, such as to ensure visual balance and avoid clustering in one area of the modified video stream 508.

The digital symbol instances generator 510 may select or generate motion paths for each instance, thereby dictating the trajectory of the symbols. The same motion path model, with potentially different parameters, may be used for all the instances. Motion paths can be generated, for example, by a model that mimics the dispersing effect of fireworks, a linear upward moving model, a linear downward moving model, a spiral pattern model, a bouncing effects model, or a random scatter effect model. Other models may include a wave motion model (simulating the undulating movements of waves), a follow-the-leader model (where one instance acts as the leader and moves along a defined motion path, with other instances following in a sequential delay), or a magnet attraction model (instances dynamically move as if attracted by a magnetic force, congregating towards areas of the screen based on certain triggers, such as volume or pitch of the conference participant or a presenter).

To enhance depth perception, the digital symbol instances generator 510 can be configured to adjust (e.g., determine or set) the scale of each graphical symbol instance. This scaling technique creates a visual illusion of depth by presenting larger symbols as closer to the viewer and smaller symbols as more distant. The base size of a digital symbol 504, defined by its pixel dimensions, serves as the reference for scaling. For example, the foreground instances may be scaled to match the digital symbol's base size, at 100%, suggesting proximity. Conversely, background instances may be scaled down to 50% of the base dimensions of the digital symbol. In an example, the foreground instances may be randomly scaled to a value within a predefined enlargement scale (e.g., a range of [100%, 160%]); and the background instances may be randomly scaled to a value within a predefined reduction scale (e.g., a range of [20%, 60%]).

The sizes of the instances may be adjusted based on the volume or pitch of a speaker, such as the conference participant or the presenter. For example, as the volume of the speaker's voice increases, the sizes of the digital symbol instances can be proportionally increased. Consequently, louder speech results in larger instances; conversely, a decrease in volume results in smaller instances. In an example, the pitch of the speaker's voice can modulate the size of the instances. Higher pitches might be represented by progressively larger instances, reflecting the heightened emotion or urgency often associated with higher vocal tones. On the other hand, lower pitches could lead to smaller instances, aligning with the typically calmer or more serious content conveyed in lower tones. In an example, threshold-based scaling can be employed where instances only increase in size if the volume or pitch surpasses certain predefined thresholds. Threshold-based scaling approach can be used to prevent constant fluctuations in instance sizes, maintaining visual consistency while still reflecting significant changes in speech dynamics.

The digital symbol characteristics tool 512 functions to define the dynamic aspects of each digital symbol instance before its integration into a video frame. For example, the digital symbol characteristics tool 512 may identify, for each instance, a position and an orientation. The position and orientation of an instance identify where and how the instance is placed in the video frame.

The digital symbol characteristics tool 512 tool calculates spatial coordinates—x and y positions—for each instance, determining its placement within a video frame. The digital symbol characteristics tool 512 may establish a rotation angle and/or a degree of oscillation, which refers to the side-to-side movement, thus adding to the floating effect. Additionally, the tool may specify other animation characteristics such as speed, direction, and easing that contribute to a natural, lifelike motion of the digital symbol instances.

One or more models may be associated with each instance of the digital symbol 504. The one or more models may be set or selected (e.g., randomly selected) by the digital symbol instances generator 510. The one or more models may include one or more of a motion model (as mentioned above), a rotation model, or an oscillation model. The digital symbol characteristics tool 512 uses the one or more models to determine (e.g., set) the animation dynamics of each digital symbol instance over time (e.g., for each video frame). To illustrate, and as described above, a linear motion model may be associated with the instances defining the trajectory of an instance across the video frames.

The motion model may dictate the general path that an instance will follow, such as moving linearly from one point (in one frame) to another (in the subsequent frame), following a curved path, or even teleporting from one location to another instantaneously, contributing to a variety of visual effects. The rotation model may specify how an instance rotates around its axis as it moves. This may involve rotating clockwise or counterclockwise at a constant speed, changing rotation speed dynamically, or even oscillating between different angles to add complexity to the animation. The oscillation model may control a side-to-side movement of an instance, defining how it deviates from its primary path in a wave-like motion, which adds to the perception of depth and fluidity in the animation. The oscillation model may specify parameters such as the amplitude and frequency of oscillation therewith allowing for fine-tuned adjustments to how pronounced or subtle the oscillation effect appears. An example of a motion model is described with respect to FIG. 7A, and an example of a rotation model and an oscillation model are described with respect to FIG. 7B.

The frame processing tool 514 is configured to generate modified video frames of the modified video stream 508. That is, the frame processing tool 514 inserts the digital symbol instances into the video frames of the video stream 506. The frame processing tool 514 processes frames (e.g., each frame) of the video stream 506, systematically adding the digital symbols in accordance with the characteristics defined by the digital symbol characteristics tool 512.

The frame processing tool 514 may create each modified video frame in layers to construct composite frames that seamlessly merge the real (e.g., images of the conference participant) and the augmented (e.g., inserted digital symbol instances). The frame processing tool 514 may include (e.g., implement) a z-index functionality enabling control over the depth positioning of each layer. The z-index functionality can be used to layer the digital symbol instances in front of or behind specific visual elements or participants. The frame processing tool 514 may organize the components of a modified video frame of the modified video stream 508 in a specified order to achieve a coherent and depth-enhanced visual effect.

An innermost layer (e.g., a background layer) can be or include the background segment extracted from the original video frame (e.g., a frame of the video stream 506). The background layer serves as the foundational backdrop over which all subsequent layers are superimposed. The z-index can be used to manage the depth at which each instance appears. Following the background layer, the next layer consists of the background instances of the digital symbol, which are positioned to appear behind the silhouette of the conference participant. The background instances are placed over the background layer in accordance with the characteristics identified (e.g., selected or calculated) by the digital symbol characteristics tool 512.

Subsequent to the background instances, the frame processing tool 514 overlays the foreground segment of the original video frame, which includes the depiction of the conference participant. The frame processing tool 514 then layers the foreground instances, which are generated to float in front of the conference participant. The foreground instances are placed in a foreground instances layer in accordance with the characteristics identified (e.g., selected or calculated) by the digital symbol characteristics tool 512.

In some implementations, the frame processing tool 514 may include an additional tinting layer to further augment the visual dynamics of the modified video frames. This tinting layer applies a color overlay to the background segment, with the hue determined based on the predominant color of the digital symbol 504 being integrated. The tinting layer can be added to the background layer through color blending, where the tint color is applied across the background layer by adjusting the color values of the pixels of the background layer. The frame processing tool 514 may apply a blending mode and a tint opacity adjustment.

The blending mode indicates how the colors of the tinting layer are to interact with the colors of the background layer.

The frame processing tool 514 may select a multiply (darkening) mode, a screen (lightening) mode, an overlay mode, or a soft light mode, each producing different visual effects. The frame processing tool 514 can adjust the opacity of the tinting layer to control the intensity of the tint effect. A lower opacity allows more of the background layer's details to show through, while a higher opacity results in a stronger tinting effect. In an example, the opacity of 40% may be used. The tinting layer can be used to subtly alter the color tone of the background layer. The frame processing tool 514 can be configured to use the tinting layer to add thematic coherence between the digital symbol instances and the background of the modified frame and to accentuate the presence of the digital symbols. That is, the tint can enhance the overall aesthetic appeal of the modified video frame, making the digital symbol instances more pronounced against the backdrop and enriching the visual storytelling.

The tinting color can be identified based on an analysis of the color attributes of the digital symbol 504 to identify a complementary or matching color that can enhance the visual harmony of the modified video frame. Any number of techniques can be used to identify the tinting color, including color histogram analysis, k-means clustering, principal component analysis (PCA), color wheel matching, HSV (Hue, Saturation, Value) analysis, or a machine learning model, among other. Color histogram analysis and k-means clustering can be used to identify dominant colors by analyzing color frequencies and clustering similar colors, respectively. PCA reduces the color space to its most defining colors, facilitating the identification of key color attributes. The color wheel and HSV analysis can be used to select complementary or harmonious colors based on the dominant hues in the digital symbol 504. A machine learning model may be trained to predict aesthetically pleasing color combinations.

While the reaction software 500 is mainly described in the context of a 2-dimensional frames, the disclosure is not so limited. For example, certain conference participants may join a conference using an immersive device, such as a Virtual Reality (VR) or an Augmented Reality (AR) device. As such, a modified video stream appropriate for display on such devices can also be generated. That is, a modified video stream can be generated to support the 3-dimensional spatial configurations inherent in VR and AR devices. As such, the digital symbol instances can be integrated into the modified video stream in a manner that utilizes the depth and space around the virtual conference environment. For instance, participants using VR devices might see instances appearing to float around or behind other conference participant in a realistic manner, enhancing the sense of presence and interaction.

Figure 6A:
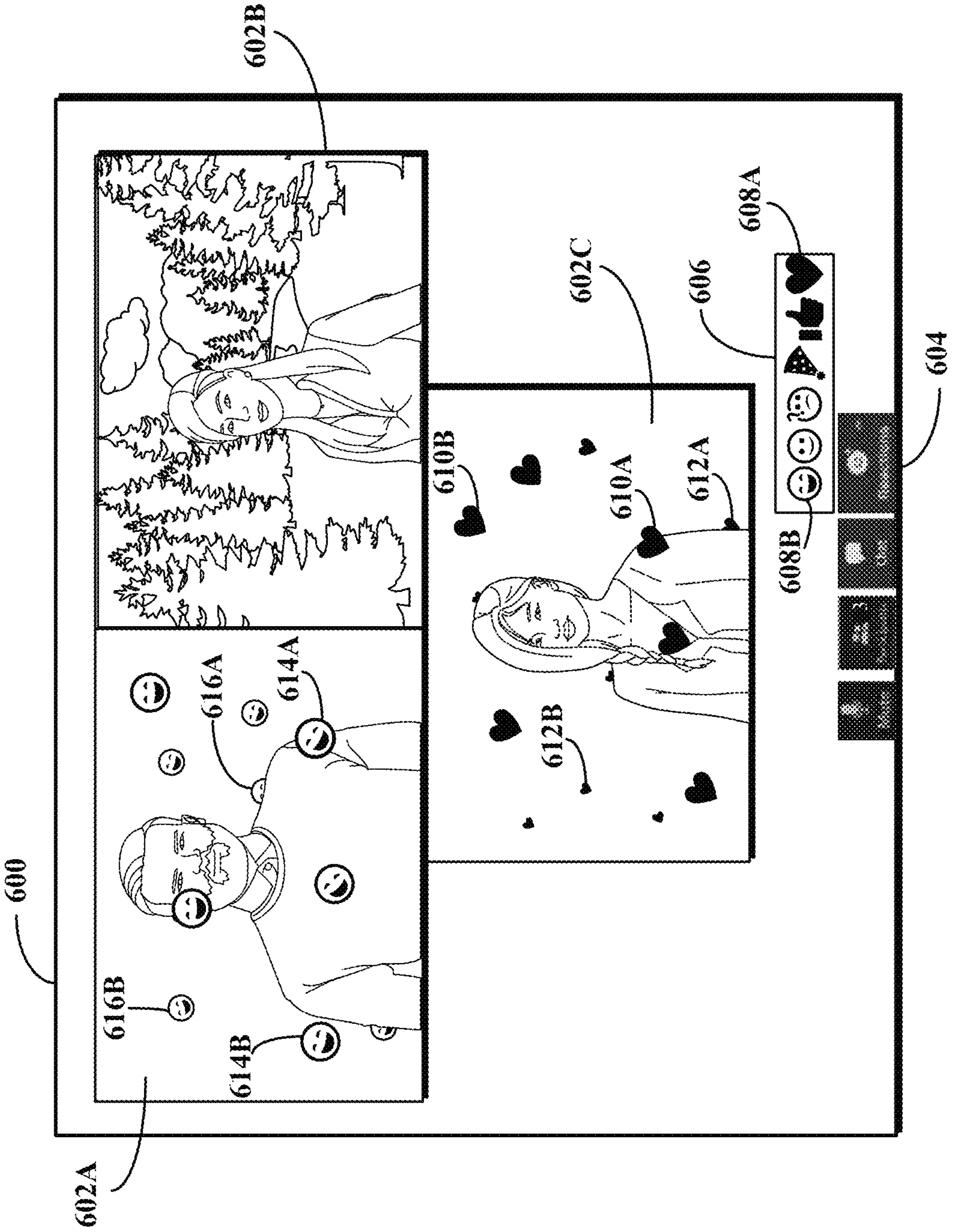
FIG. 6A illustrates an example of a conferencing user interface associated with a video conference.

FIG. 6A illustrates an example of a conferencing user interface 600 associated with a video conference. The conferencing user interface 600 can be displayed at a device of a conference participant, such as the client 408 or the client 410 of FIG. 4, or the client 502 of FIG. 5. The user interface 600 can also be displayed at a device that includes the reaction software 500 of FIG. 5.

The conferencing user interface 600 illustrates that three conference participants are connected to the video conference via their respective devices. Each of the conference participants may be represented with a respective tile that includes a digital representation of that conference participant. The conferencing user interface 600 includes tiles 602A-602C corresponding to the three conference participants. Each of the tiles 602A-602C includes a likeliness (e.g., an image) of the corresponding conference participant. The tile 602B illustrates that the corresponding conference participant has enabled a virtual background. For simplicity of illustration, the tiles 602A and 602C are shown with uniform backgrounds, implying the absence of any complex backdrop or the replacement of the original backgrounds with solid colors. However, the use of dynamic floating reactions is not restricted to simple or solid backgrounds.

A control 604, when invoked by a conference participant, enables the conference participant to select a digital symbol indicating their reaction from a set of available digital symbols 606. Each conference participant's tile displays instances of the digital symbol that that conference participant selects. FIG. 6A illustrates that the conference participants associated with the tiles 602A and 602C selected digital symbols 608B and 608A, respectively. As such, the tiles 602A and 602C include instances of the selected digital symbols 608B and 608A, respectively. The video streams displayed in the tiles 602A and 602C are modified video stream generated at the devices of the corresponding conference participants by a reaction software, such as the reaction software 500, therein.

In the tile 602A, digital symbol instances 614A and 614B (smiley faces) appear in the foreground of the participant's image, while digital symbol instances 616A and 616B (smiley faces) appear in the background. The tile 602C shows digital symbol instances 610A and 610B (hearts) in the foreground of the participant's image, with digital symbol instances 612A and 612B (hearts) in the background. Because the digital symbol instances 612A and 616A are background instances, they are partially obscured by the silhouettes (the foreground segments) of the respective conference participants; and because the digital symbol instances 610A and 614A are foreground instances, they overlay the silhouettes (the foreground segments) of the respective conference participants. These digital symbol copies are rendered according to various characteristics, as described above, such as in various sizes and layers to create a sense of depth, with larger, fully opaque symbols in the foreground and smaller symbols in the background.

While not specifically shown in FIG. 6A, when the next frames of each of the modified video streams is shown in the tiles 602A and 602C, the digital symbol instances may be shown at different positions. For example, if the associated motion models are a linear, upward moving models, then the digital symbol instances would be shown at vertically higher positions. The digital symbol instances may have different rotations, different horizontal positions, or the like, based on the respective models, and as described above with respect to digital symbol characteristics tool 512 of FIG. 5.

Figure 6B:
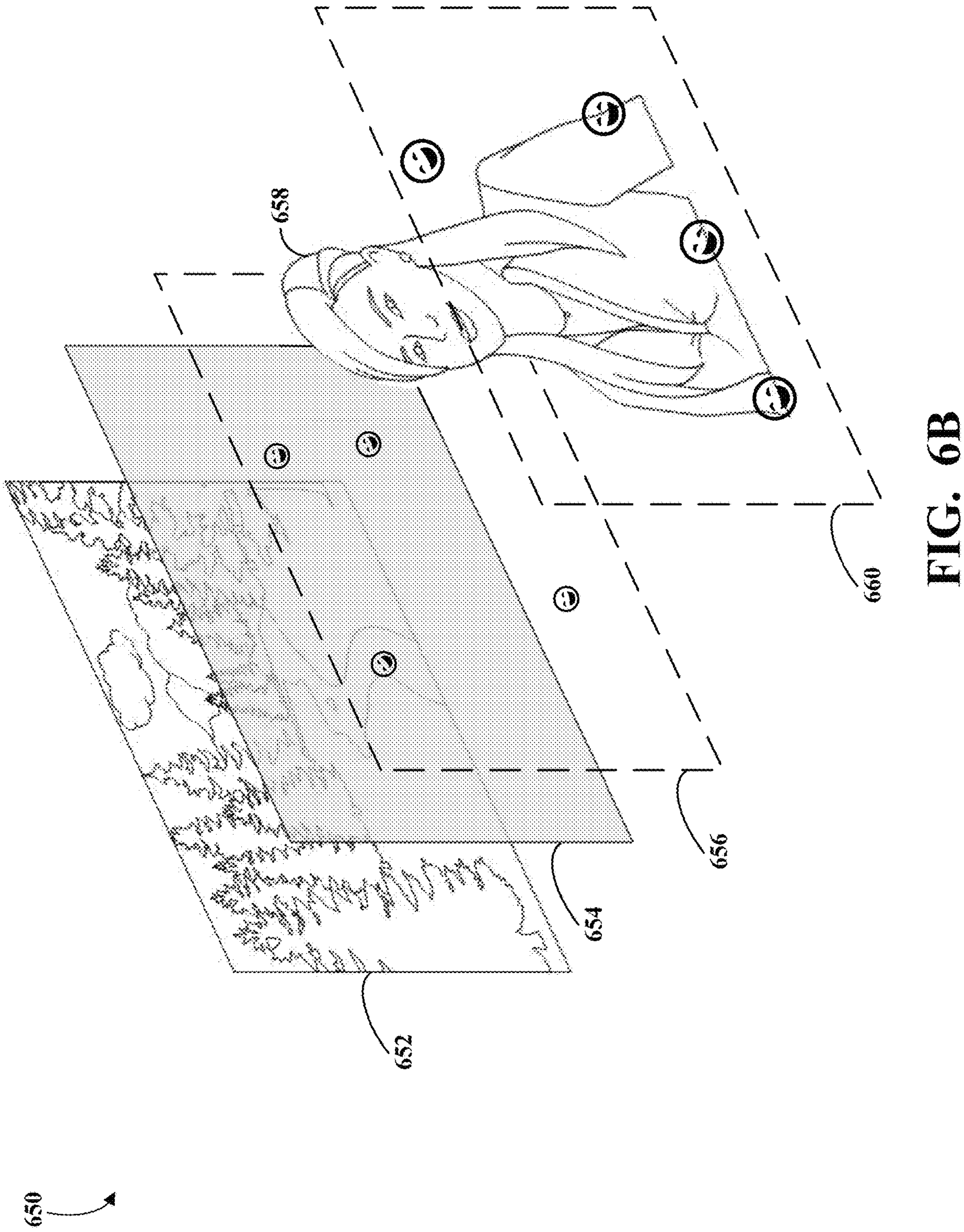
FIG. 6B illustrates an example of layers of a modified frame of a modified video stream.

FIG. 6B illustrates an example 650 of layers of a modified frame of a modified video stream. As described above, the frame processing tool 514 of FIG. 5 may use layers to construct composite frames that merge the real (e.g., images of the conference participant) and the augmented (e.g., inserted digital symbol instances). The frame processing tool 514 organizes the components of a modified video frame in a specified order to achieve a coherent and depth-enhanced visual effect.

An innermost layer (i.e., a background layer 652) can be or include the background segment extracted from an original video frame (e.g., a frame of the video stream 506 of FIG. 5). The background layer 652 may be an actual background or a virtual background. The background layer 652 serves as the foundational backdrop over which all subsequent layers are superimposed.

As mentioned above, a modified frame may include an optional tinting layer. As such, the example 650 includes a tinting layer 654. The frame processing tool 514 selects a blending mode and adjusts the tint opacity to achieve a desired (e.g., configured) visual effect. For instance, an opacity of 40% may be chosen to balance the visibility of the background details with the impact of the tinting effect.

Overlaying the tinting layer 654, the next layer (e.g., a layer 656) includes the background instances of the digital symbol, positioned to appear behind the foreground layer 658, which includes the foreground segment extracted from the original video frame. The background instances are placed over the background layer 652 in accordance with the characteristics identified by the digital symbol characteristics tool 512.

Subsequent to the background instances (e.g., the layer 656), the frame processing tool 514 overlays the foreground layer 658, which includes the depiction of the conference participant. The frame processing tool 514 then adds the foreground instances, generated to float in front of the conference participant, into a foreground instances layer 660. These foreground instances, visible in front of the foreground layer 658, are placed in accordance with the characteristics identified by the digital symbol characteristics tool 512.

Figure 7A:
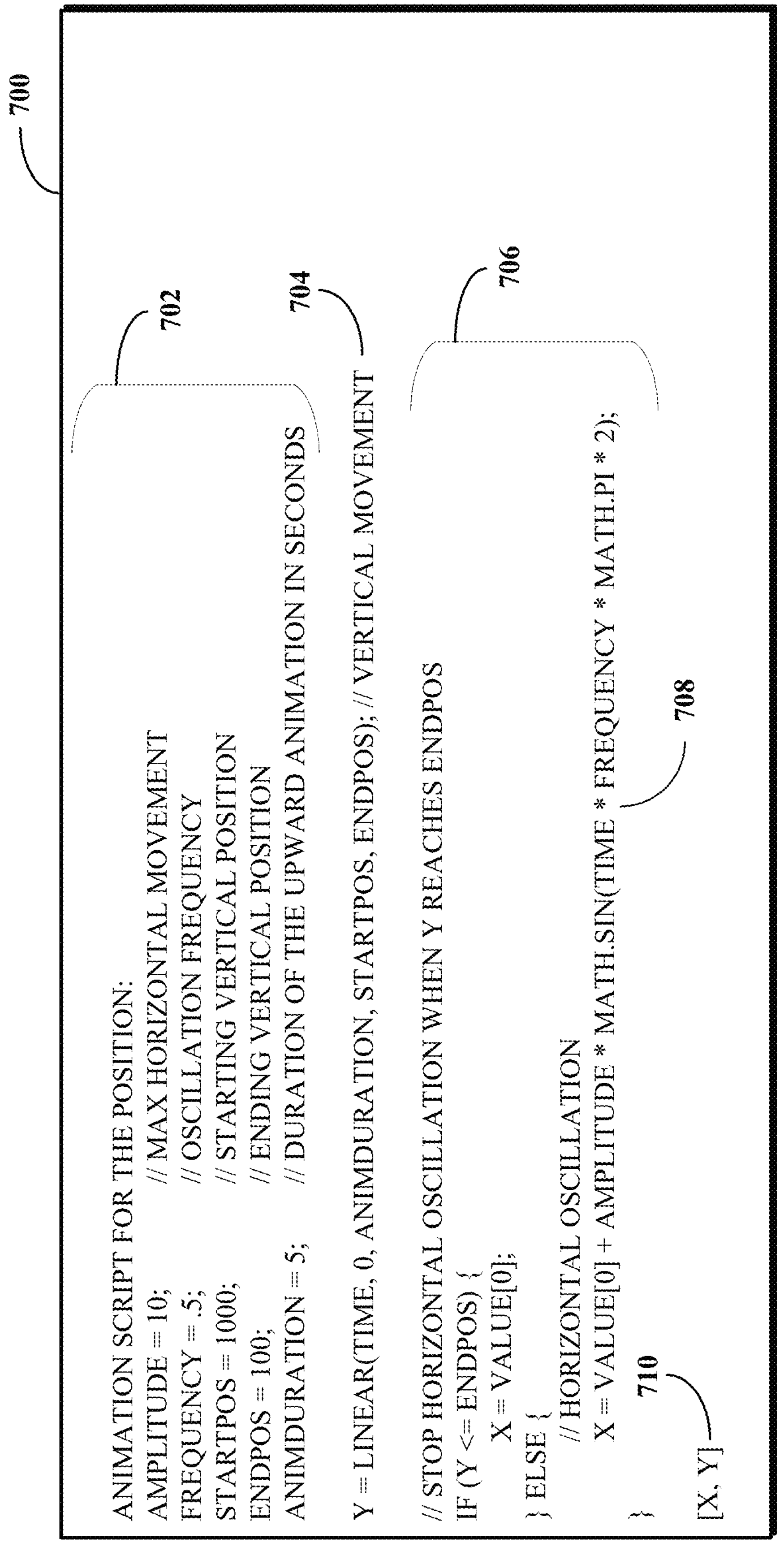
FIGS. 7A-7B illustrate examples of models that may be used to animate instances of digital symbols over several frames of a video stream.
Figure 7B:
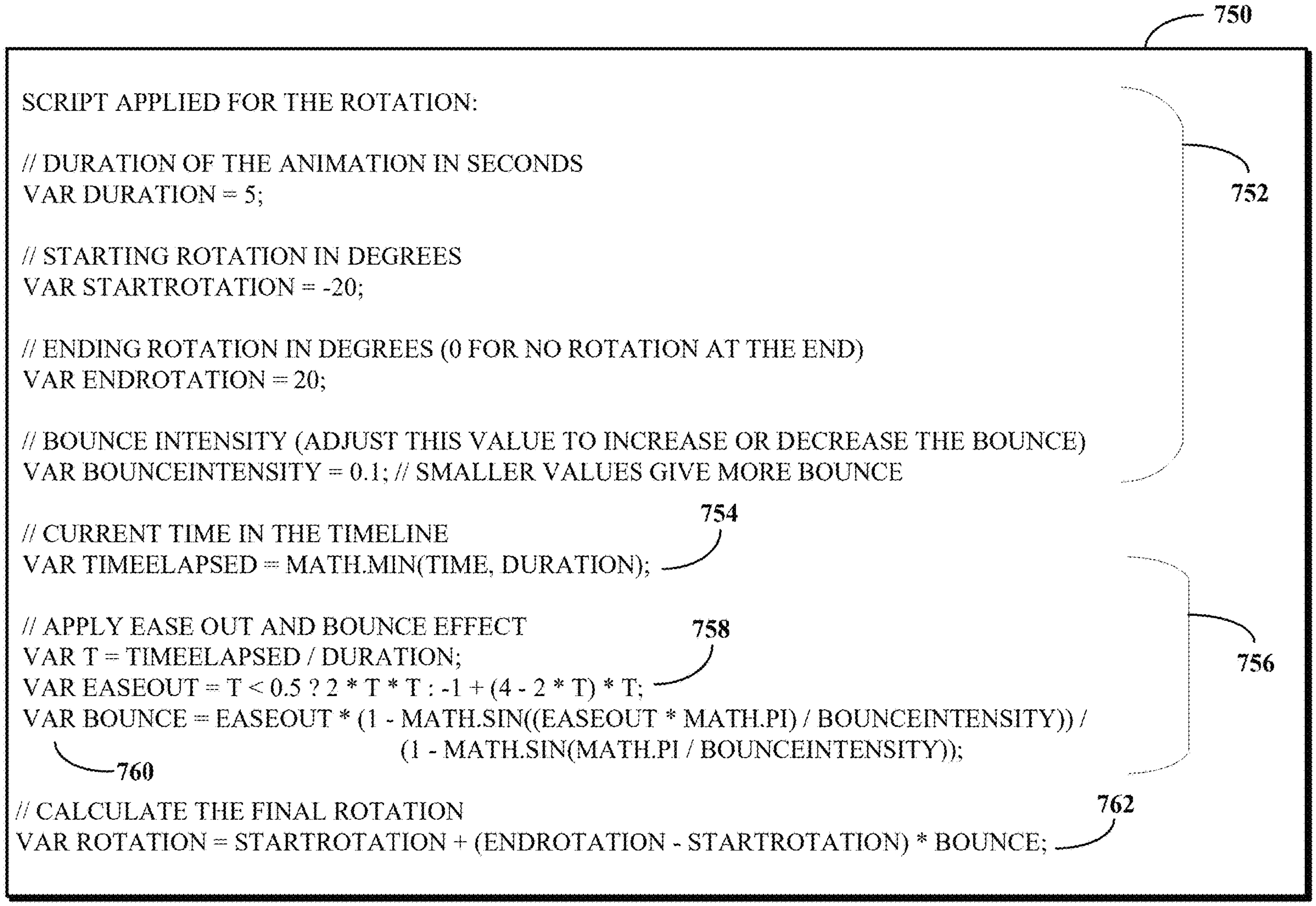

FIGS. 7A-7B illustrate examples of models 700 and 750 that may be used to animate instances of digital symbols over several frames of a video stream. The models may be implemented by a reaction software, such as the reaction software 500 of FIG. 5. The models 700 and 750 calculate the x and y positions of an instance of a digital symbol (referred to herein as an "object") over time to create an animation effect that combines vertical linear movement with rotation and horizontal oscillation. It is noted that the disclosure herein is not limited to or by these models and other models are possible.

A section 702 defines variables for the animation. The variable amplitude defines the maximum horizontal movement distance of the object. The variable amplitude determines the width of the oscillation (how far left and right the object moves). The variable frequency defines the rate of horizontal oscillation of the object and controls how fast the oscillation occurs (how quickly the object moves back and forth).

The variable startPos defines the starting vertical position of the object. The variable endPos defines the ending vertical position of the object. The variable animDuration define the total duration of the animation of the object in seconds. While these variables are set to fixed values, for illustration purposes, these variables may be differently configured for each of the instances of the digital symbol. In an example, these variable may be randomly set, each within predefined ranges.

The model 700 assumes a linear, vertical movement model. At line 704, the vertical position is calculated. The y position is determined by a linear interpolation (linear ( ) function that smoothly transitions the vertical position y from startPos to endPos over the duration animDuration. The time variable represents the current time elapsed in the animation, which is compared against the total animation duration, animDuration, to determine the proportion of the animation completed and thus the current y position. This creates a smooth vertical movement from the starting to the ending position over the specified time. It is again noted that other motion models are possible, as described herein.

At section 706, the horizontal movement is calculated. If y (the vertical position) is less than or equal to endPos, indicating the object has reached or passed its vertical destination, the horizontal position x stops oscillating and remains constant. Otherwise, the horizontal position x is calculated by adding a sinusoidal oscillation to the original (e.g., current) x position. The oscillation's amplitude and frequency are defined by the amplitude and frequency variables, creating a back-and-forth movement between frames of the modified video stream. At line 708, Math·sin (time*frequency*Math·PI*2) generates a sine wave based on the elapsed time, creating the oscillatory motion. The multiplication by Math·PI*2 converts the frequency into radians per second so that the sine function can produce the desired oscillatory pattern.

A line 710 illustrates that the final position [x, y] is a combination of the above calculations, creating an animation where the object moves vertically while oscillating horizontally until it reaches its destination.

The model 750 animates the rotation of the object therewith adding a "bounce" effect towards the end. A section 752 defines variables relating to the rotation. The variable duration defines the total duration of the rotation animation, in seconds. The variable startRotation defines the initial rotation angle, in degrees. The variable endRotation defines the final rotation angle, in degrees. The variable bounceIntensity defines a parameter that controls the intensity of the bounce effect where lower values result in more bounce. At line 754, the model 750 calculates the elapsed time timeElapsed as the minimum between the current time and the animation duration to ensure the animation does not exceed its intended length.

The model 750 employs an "ease-out" effect, which initially accelerates the rotation and then decelerates the rotation towards the end of the animation. This is further modified by a "bounce" effect, achieved through a combination of mathematical operations shown in section 756. At line 758, the easeOut calculation uses a piecewise quadratic function (e.g., T<0.5?2*T*T:−1+(4−2*T)*T) to create acceleration at the beginning and deceleration at the end of the animation. For the first half of the animation duration (when t<0.5), the function follows a quadratic form: 2*t*t. This part of the function describes a parabolic curve that starts at 0 and accelerates upwards as t approaches 0.5. For the second half of the animation duration (when t>=0.5), the function shifts to a different quadratic expression: −1+(4−2*t)*t. This expression ensures the curve decelerates as t moves beyond 0.5 towards 1, ending in a soft landing as the animation concludes.

At line 760, the bounce value is calculated by modifying easeOut with a sine function to introduce oscillations towards the end of the rotation, simulating a bouncing effect. The bounceIntensity variable influences the frequency and amplitude of these oscillations, with lower values increasing the bounce. At line 762, the value of final rotation is calculated by interpolating between startRotation and endRotation using the modified ease-out and bounce values.

Figure 8:
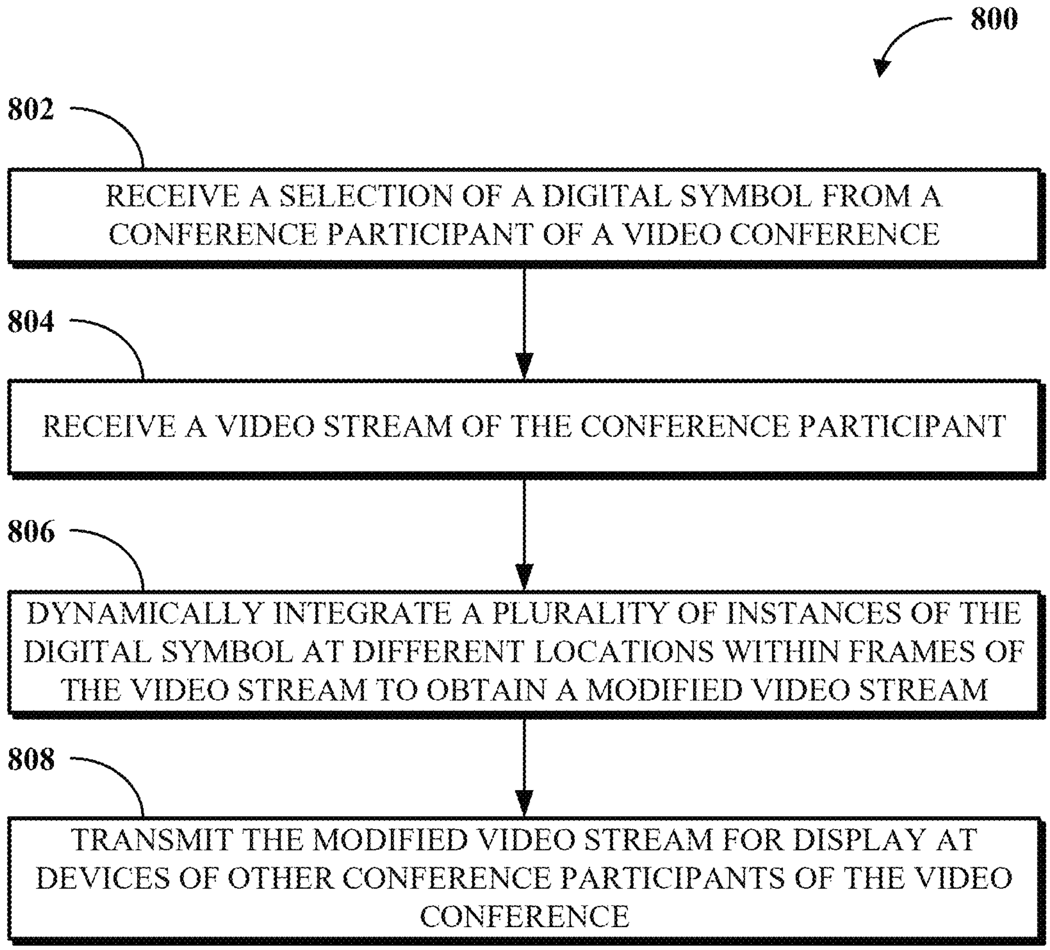
FIG. 8 is a flowchart of an example of a technique for dynamic floating reactions in video conferences.

To further describe some implementations in greater detail, reference is next made to examples of techniques which may be performed by or using a system for dynamic floating reactions in video conferences. FIG. 8 is a flowchart of an example of a technique 800 for dynamic floating reactions in video conferences. The technique 800 can be executed using computing devices, such as the systems, hardware, and software described with respect to FIGS. 1-7B. The technique 800 can be implemented by a reaction software, such as the reaction software 500 of FIG. 5. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a selection of a digital symbol is received from a conference participant of a video conference. The digital symbol can be received a described with respect to FIG. 6A. For example, the conference participant may select the digital symbol from a set of available digital symbols. The digital symbol can be the digital symbol 504 of FIG. 5. At 804, a video stream of the conference participant is received. The video stream can be the video stream 506 of FIG. 5.

At 806, a plurality of instances of the digital symbol are dynamically integrated at different locations within frames of the video stream to obtain a modified video stream. In an example, a first instance of the plurality of the instances of the digital symbol may be set to a first size and a second instance may be set to a second size that is different from the first size. Said another way, the plurality of the instances of the digital symbol can have varying scales. As such, instances of the digital symbol in front of images of the conference participant can be displayed at a larger scale compared to instances of the digital symbol displayed behind the images of the conference participant.

As described herein, such as with respect to FIG. 6A, dynamically integrating the plurality of instances can include obtaining a foreground segment of a frame of the video stream, obtaining a background segment of the frame; and obtaining a modified frame of the modified video frame by layering at least one of the plurality of instances between the foreground segment and the background segment and layering at least another of the plurality of instances in front of the foreground segment. That is, at least a first of the plurality of instances of the digital symbol is placed in a layer that overlays a foreground segment of a frame of the video stream and at least a second of the plurality of instances of the digital symbol is placed in a layer that is overlayed by the foreground segment.

In an example, a tinting layer may be included in frames of the modified video stream. As such, a background segment of a frame of the video stream can be tinted based on the digital symbol to obtain a background segment of a corresponding frame of the modified video stream.

At least one of the plurality of the instances may be vertically oscillated from a starting position to an ending position within frames of the modified video stream. The vertical oscillation can be defined by an animation duration from the starting position to the ending position. The oscillation can be at least as described with respect to FIG. 7A. As such, one of the plurality of the instances of the digital symbol may be animated to simulate a floating effect by incorporating a horizontal oscillation that is based on a sinusoidal movement pattern.

At 808, the modified video stream is transmitted for display at devices of other conference participants of the video conference. The modified video stream can also be displayed at the device at which the modified video stream is generated.

It will be appreciated that the present disclosure may include any one and up to all of the following aspects.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method. The method includes receiving a selection of a digital symbol from a conference participant of a video conference. The method also includes receiving a video stream of the conference participant. The method also includes dynamically integrating a plurality of instances of the digital symbol at different locations within frames of the video stream to obtain a modified video stream. The method also includes transmitting the modified video stream for display at devices of other conference participants of the video conference. Other embodiments of this aspect include corresponding computer systems, apparatus, and computer programs recorded on one or more computer storage devices, each configured to perform the actions of the methods.

Implementations may include one or more of the following features.

The method where dynamically integrating the plurality of the instances of the digital symbol at the different locations within the frames of the video stream to obtain the modified video stream may include setting a first instance of the plurality of the instances of the digital symbol to a first size; and setting a second instance of the plurality of the instances of the digital symbol to a second size that is different from the first size.

The method may include determining the first size based on a volume of a voice of the conference participant.

Dynamically integrating the plurality of the instances of the digital symbol at the different locations within the frames of the video stream to obtain the modified video stream may include obtaining a foreground segment of a frame of the video stream; obtaining a background segment of the frame; and obtaining a modified frame of the modified video stream by layering at least one of the plurality of instances between the foreground segment and the background segment and layering at least another of the plurality of instances in front of the foreground segment.

Dynamically integrating the plurality of the instances of the digital symbol at the different locations within the frames of the video stream to obtain the modified video stream may include placing one of the plurality of the instances of the digital symbol between a starting position and an ending position within frames of the modified video stream according to a motion model.

Dynamically integrating the plurality of the instances of the digital symbol at the different locations within the frames of the video stream to obtain the modified video stream may include obtaining a background segment of a frame of the video stream; and obtaining a corresponding frame of the modified video stream by modifying a tint of the background segment based on the digital symbol.

One general aspect includes a device that includes a memory; and a processor. The processor configured to execute instructions stored in the memory to receive a selection of a digital symbol from a conference participant of a video conference; receive a video stream of the conference participant; dynamically integrate a plurality of instances of the digital symbol at different locations within frames of the video stream to obtain a modified video stream; and transmit the modified video stream for display at devices of other conference participants of the video conference. Other embodiments of this aspect include corresponding computer systems, apparatus, and computer programs recorded on one or more computer storage devices, each configured to perform the actions of the methods.

Implementations may include one or more of the following features.

The device where the plurality of the instances of the digital symbol may have varying scales.

At least a first of the plurality of instances of the digital symbol may be placed in a first layer that overlays a foreground segment of a frame of the video stream and at least a second of the plurality of instances of the digital symbol may be placed in a second layer that is overlayed by the foreground segment.

The processor can be configured to execute instructions stored in the memory to display the modified video stream at the device.

At least one of the instances of the digital symbol can be sized based on an audio stream associated with the video conference.

The digital symbol can be at least one of an emoji, an emoticon, a text string, a graphical icon, or an animated element.

The processor can be further configured to execute instructions stored in the memory to overlay, in the modified video stream, a tinting layer over a background layer, where a color of the tinting layer is based on the digital symbol.

One general aspect includes a non-transitory computer-readable storage medium that includes instructions that when executed by one or more processors perform operations including receiving a selection of a digital symbol from a conference participant of a video conference; receiving a video stream of the conference participant; dynamically integrating a plurality of instances of the digital symbol at different locations within frames of the video stream to obtain a modified video stream; and transmitting the modified video stream for display at devices of other conference participants of the video conference.

Implementations may include one or more of the following features.

The non-transitory computer-readable storage medium where some of the plurality of the instances can appear in front of images of the conference participant and some others of the plurality of the instances can appear behind the images of the conference participant.

The plurality of the instances of the digital symbol may include instances varying in size.

Instances of the digital symbol in front of images of the conference participant can be displayed at a larger scale compared to instances of the digital symbol behind the images of the conference participant.

Dynamically integrating the plurality of the instances of the digital symbol at the different locations within the frames of the video stream to obtain the modified video stream may include animating one of the plurality of the instances of the digital symbol to simulate a floating effect by incorporating a horizontal oscillation that is based on a sinusoidal movement pattern.

Dynamically integrating the plurality of instances of the digital symbol at different locations within frames of the video stream to obtain the modified video stream may include applying a tinting color to a background segment of a frame of the video stream to obtain a background segment of a frame of the modified video stream.

The operations may include overlaying, in the modified video stream, a tinting layer over a background layer.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random-access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving a selection of a digital symbol from a conference participant of a video conference;

receiving a video stream of the conference participant;

dynamically integrating a plurality of instances of the digital symbol at different locations within frames of the video stream to obtain a modified video stream, wherein dynamically integrating the plurality of instances comprises:

obtaining a foreground segment of a frame of the video stream;

obtaining a background segment of the frame;

obtaining a modified frame of the modified video stream by layering at least one of the plurality of instances between the foreground segment and the background segment and layering at least another of the plurality of instances in front of the foreground segment; and placing one of the plurality of the instances of the digital symbol between a starting position and an ending position within frames of the modified video stream according to a motion model to simulate a floating effect, wherein the motion model combines vertical movement from the starting position to the ending position with horizontal oscillation based on a sinusoidal function, the horizontal oscillation being defined by an amplitude that defines a maximum horizontal movement distance and a frequency that defines a rate of oscillation, wherein the horizontal oscillation stops when the one of the plurality of the instances reaches the ending position; and transmitting the modified video stream for display at devices of other conference participants of the video conference.

2. The method of claim 1, wherein dynamically integrating the plurality of the instances of the digital symbol at the different locations within the frames of the video stream to obtain the modified video stream comprises:

setting a first instance of the plurality of the instances of the digital symbol to a first size; and setting a second instance of the plurality of the instances of the digital symbol to a second size that is different from the first size.

3. The method of claim 2, further comprising:

determining the first size based on a volume of a voice of the conference participant.

4. The method of claim 1, wherein dynamically integrating the plurality of the instances of the digital symbol at the different locations within the frames of the video stream to obtain the modified video stream further comprises:

obtaining a corresponding frame of the modified video stream by modifying a tint of the background segment based on the digital symbol.

5. The method of claim 1, wherein the motion model defines a vertical position of the one of the plurality of the instances using a linear interpolation from the starting position to the ending position over an animation duration.

6. The method of claim 1, wherein the motion model further defines a rotation of the one of the plurality of the instances that includes an ease-out effect that accelerates the rotation initially and decelerates the rotation toward an end of an animation duration.

7. The method of claim 1, wherein a first quantity of the plurality of instances are foreground instances layered in front of the foreground segment and a second quantity of the plurality of instances are background instances layered between the foreground segment and the background segment, wherein an absolute difference between the first quantity and the second quantity does not exceed a threshold difference.

8. A device, comprising:

a memory; and a processor, the processor configured to execute instructions stored in the memory to:

receive a selection of a digital symbol from a conference participant of a video conference;

receive a video stream of the conference participant;

dynamically integrate a plurality of instances of the digital symbol at different locations within frames of the video stream to obtain a modified video stream, wherein to dynamically integrate the plurality of instances comprises to:

obtain a foreground segment of a frame of the video stream;

obtain a background segment of the frame;

obtain a modified frame of the modified video stream by layering at least one of the plurality of instances between the foreground segment and the background segment and layering at least another of the plurality of instances in front of the foreground segment; and place one of the plurality of the instances of the digital symbol between a starting position and an ending position within frames of the modified video stream according to a motion model to simulate a floating effect, wherein the motion model combines vertical movement from the starting position to the ending position with horizontal oscillation based on a sinusoidal function, the horizontal oscillation being defined by an amplitude that defines a maximum horizontal movement distance and a frequency that defines a rate of oscillation, wherein the horizontal oscillation stops when the one of the plurality of the instances reaches the ending position; and transmit the modified video stream for display at devices of other conference participants of the video conference.

9. The device of claim 8, wherein the plurality of the instances of the digital symbol have varying scales.

10. The device of claim 8, wherein the processor is configured to execute instructions stored in the memory to:

display the modified video stream at the device.

11. The device of claim 8, wherein at least one of the instances of the digital symbol is sized based on an audio stream associated with the video conference.

12. The device of claim 8, wherein the digital symbol is at least one of an emoji, an emoticon, a text string, a graphical icon, or an animated element.

13. The device of claim 8, wherein the processor is further configured to execute instructions stored in the memory to:

overlay, in the modified video stream, a tinting layer over a background layer, wherein a color of the tinting layer is based on the digital symbol.

14. The device of claim 8, wherein the processor is configured to execute instructions stored in the memory to:

assign respective starting positions to the plurality of instances such that the plurality of instances are distributed throughout different regions of the frame to maintain visual balance.

15. A non-transitory computer-readable storage medium, comprising executable instructions that, when executed by a processor, facilitate performance of operations comprising:

receiving a selection of a digital symbol from a conference participant of a video conference;

receiving a video stream of the conference participant;

dynamically integrating a plurality of instances of the digital symbol at different locations within frames of the video stream to obtain a modified video stream, wherein dynamically integrating the plurality of instances comprises:

obtaining a foreground segment of a frame of the video stream;

obtaining a background segment of the frame;

obtaining a modified frame of the modified video stream by layering at least one of the plurality of instances between the foreground segment and the background segment and layering at least another of the plurality of instances in front of the foreground segment; and placing one of the plurality of the instances of the digital symbol between a starting position and an ending position within frames of the modified video stream according to a motion model to simulate a floating effect, wherein the motion model combines vertical movement from the starting position to the ending position with horizontal oscillation based on a sinusoidal function, the horizontal oscillation being defined by an amplitude that defines a maximum horizontal movement distance and a frequency that defines a rate of oscillation, wherein the horizontal oscillation stops when the one of the plurality of the instances reaches the ending position; and transmitting the modified video stream for display at devices of other conference participants of the video conference.

16. The non-transitory computer-readable storage medium of claim 15, wherein the plurality of the instances of the digital symbol include instances varying in size.

17. The non-transitory computer-readable storage medium of claim 15, wherein instances of the digital symbol in front of images of the conference participant are displayed at a larger scale compared to instances of the digital symbol behind the images of the conference participant.

18. The non-transitory computer-readable storage medium of claim 15, wherein dynamically integrating the plurality of instances of the digital symbol at different locations within frames of the video stream to obtain the modified video stream further comprises:

applying a tinting color to a background segment of a frame of the video stream to obtain a background segment of a frame of the modified video stream.

19. The non-transitory computer-readable storage medium of claim 18, wherein the tinting color is identified by analyzing color attributes of the digital symbol to identify a complementary or matching color using at least one of color histogram analysis, k-means clustering, principal component analysis, color wheel matching, or Hue, Saturation, Value analysis.

20. The non-transitory computer-readable storage medium of claim 15, wherein the operations comprise:

overlaying, in the modified video stream, a tinting layer over a background layer.

* * * * *